United States Patent
Iizuka et al.

(10) Patent No.: US 7,221,852 B2
(45) Date of Patent: May 22, 2007

(54) MOTION PICTURE PLAYBACK APPARATUS AND MOTION PICTURE PLAYBACK METHOD

(75) Inventors: Akira Iizuka, Hamamatsu (JP); Hiroyuki Iwase, Hamamatsu (JP); Kazuhiko Shuto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1097 days.

(21) Appl. No.: 10/138,400

(22) Filed: May 3, 2002

(65) Prior Publication Data

US 2002/0168176 A1 Nov. 14, 2002

(30) Foreign Application Priority Data

May 10, 2001 (JP) ............................. 2001-140674

(51) Int. Cl.
*H04N 5/76* (2006.01)
*H04N 7/00* (2006.01)

(52) U.S. Cl. ........................... 386/68; 386/69; 386/70; 386/95

(58) Field of Classification Search ................. 386/68, 386/69, 70, 95; 434/307 A, 318
See application file for complete search history.

(56) References Cited

U.S. PATENT DOCUMENTS

| | | | |
|---|---|---|---|
| 4,419,920 A | 12/1983 | Ohe | |
| 5,587,546 A | 12/1996 | Kato et al. | |
| 5,613,909 A | 3/1997 | Stelovsky | |
| 5,883,970 A | 3/1999 | Kikuchi | |
| 5,952,597 A * | 9/1999 | Weinstock et al. | 84/609 |
| 5,969,716 A * | 10/1999 | Davis et al. | 715/726 |
| 6,056,555 A | 5/2000 | Tada | |
| 6,088,733 A | 7/2000 | Kikuchi | |
| 6,353,170 B1 * | 3/2002 | Eyzaguirre et al. | 84/603 |
| 6,493,038 B1 * | 12/2002 | Singh et al. | 348/565 |

FOREIGN PATENT DOCUMENTS

| | | |
|---|---|---|
| JP | 7020886 | 1/1995 |
| JP | 7064580 | 3/1995 |
| JP | 7212715 | 8/1995 |
| JP | 8254984 | 10/1996 |
| JP | 11-126066 | 5/1999 |

* cited by examiner

*Primary Examiner*—Thai Q. Tran
*Assistant Examiner*—Gelek Topgyal
(74) *Attorney, Agent, or Firm*—Morrison & Foerster LLP

(57) ABSTRACT

The present invention is directed to a motion-picture time scale control instruction system for time-controlled playback of motion picture in accordance with a time-scale control signal. In accordance with the preferred embodiment, during playback of motion-picture data, the CPU of the system outputs to a time-scale control section a time-scale control signal corresponding to a tempo of a piece of music output from a tempo detection mechanism. The time-scale control section adjusts the playback speed of motion-picture data in accordance with the time-scale control signal. The motion-picture playback section reads the motion-picture data from a dedicated RAM while increasing or decreasing the read-out time for each unit of data in accordance with the adjusted playback speed, and outputs the read motion-picture data to the display. On the basis of the timing set information, the system can read the motion-picture data in synchronism with the specific music performance timing, and output the read motion-picture data to the display in synchronism with the played music.

12 Claims, 9 Drawing Sheets

MOTION PICTURE PLAYBACK APPARATUS AND MOTION PICTURE PLAYBACK METHOD

BACKGROUND OF THE INVENTION

1. Field of the Invention

The present invention relates to a motion picture playback apparatus and method which can play back and display a motion picture in synchronism with music by means of controlling the time scale of the motion picture.

2. Description of the Related Art

Conventionally, apparatuses capable of playing back motion pictures and apparatuses capable of playing music at designated tempi have existed. Further, there have existed apparatuses, such as a videotape recorder, which can change playback speed in a simple manner; e.g., halving or doubling playback speed, during playback of a motion picture.

However, conventional apparatuses cannot match a tempo of music with a playback speed of a motion picture. Further, even in the case in which playback of a piece of music and playback of a motion picture are started simultaneously to thereby synchronize the piece of music and the motion picture at their beginning, a problem arises if the tempo is changed while the music is playing. Specifically, when the tempo is increased while the music is playing, some frames of the motion picture are left unreproduced (i.e., are not played back); when the tempo of the music is slowed, the frames of the motion picture become insufficient. Moreover, the conventional apparatuses cannot cause a motion picture to enter looped playback while following changes in tempo.

SUMMARY OF THE INVENTION

In view of the problems involved in the conventional techniques, an object of the present invention is to provide a motion picture playback apparatus and method which can variably control the time scale of a motion picture during playback thereof to thereby enable the motion picture to be played back and displayed in synchronism with a played piece of music.

The present invention provides a motion picture playback apparatus and method which play back motion-picture data which are stored in a motion-picture data memory and represent a motion picture, and display the motion picture on a display device. In the motion picture playback apparatus and method, tempo information representing a tempo of a piece of music are received during playback of motion-picture data; and the motion-picture data are read out from the motion-picture data memory at a read-out speed corresponding to the received tempo information and are output to the display device.

In this case, playback of the motion-picture data is performed as follows. A playback speed control signal for controlling the playback speed of the motion-picture data is generated in accordance with the received tempo information. The motion-picture data are read out from the motion-picture data memory at a read-out rate which defines a read-out time for a unit of data and which is changed by the generated playback speed control signal. The playback speed control signal serves as time scale control data used for controlling the time scale for playback of the motion-picture data.

Further, a tempo clock signal which represents the tempo of the piece of music or a time code which represents playback time of music data may be used as the tempo information. The tempo clock signal and the time code may be those defined by the MIDI standard. Further, an operation element which is operated by a user to designate a tempo of the piece of music may be employed, and the operated position of the operation element may be used as tempo information. In this case, preferably, the operation element is configured in such a manner that the operation element displaces along a single-dimensional direction along, for example, a straight line or a circle, and the single-dimensional position of the operation element is detected as the tempo information. The tempo information, which represents the tempo of the piece of music, represent playback speed of music performance data used for automatically producing the melody, rhythm, and accompaniment of the piece of music.

By virtue of the above-described feature, the time scale for playback of motion-picture data is controlled in accordance with the tempo of the piece of music in such a manner that the playback time of the motion picture in a certain section (represented by, for example, the number of frames) follows the length of the corresponding section of the piece of music (represented by, for example, the number of bars, cadences, or ticks). Accordingly, even when the tempo of the piece of music is changed during playback of motion-picture data, the motion-picture data can be played back to match the tempo.

Another feature of the present invention resides in that timing set information for designating synchronization of a playback timing of at least one music data set among a series of music data sets with a playback timing of at least one motion-picture data set among the series of motion-picture data sets is output, the timing of reading-out of the motion-picture data from the motion-picture data memory is controlled on the basis of the output timing set information in such a manner that the playback timing of the at least one music data set coincides with the playback timing of the at lest one motion-picture data set, and the read-out motion-picture data are output to the display device.

The timing set information for synchronizing playback timings of at least two music data sets among the series of music data sets with playback timings of at least two motion-picture data sets among the series of motion-picture data sets may be output. In this case, the timing of reading-out of the motion-picture data from the motion-picture data memory is controlled on the basis of the output timing set information in such a manner that the playback timings of the at least two music data sets coincide with the playback timings of the at least two motion-picture data sets, respectively, and the read-out motion-picture data are output to the display device.

In these cases, the timing set information represents a specific section of the music data to be synchronized with a specific frame of the motion-picture data. In other words, the timing set information represents a specific frame of the motion-picture data to be synchronized with a specific section of the music data. The specific section of the music data may be represented by use of an absolute time after start of playback of the music data, or the number of bars, cadences, or ticks. Further, the music data may be music performance data used for automatically producing the melody, rhythm, and accompaniment of the piece of music.

By virtue of the above-described feature, a desired frame of the motion-picture data can be played back in synchronism with a desired portion of the music data, irrespective of changes in the tempo of the music. Further, since the motion-picture data can be played back without damaging a spliced portion of the motion picture, motion-picture data for looped playback can be used. Therefore, an accented portion of the piece of music can be synchronized with a certain frame of the motion picture during real-time work. Thus, a variety of manners for synchronization can used at a site where music performance and motion-picture playback are performed.

In particular, when a user performs looped playback of a motion picture for a VJ (Video Jockey), the user can use a favorite motion picture and play back the motion picture while coping with any tempo, without having to prepare numerous motion pictures corresponding to different tempos. Accordingly, in the case in which a DJ (Disc Jockey) and a VJ encounter difficulty in making a previous arrangement concerning such looped playback, the VJ can cope with such looped playback according to circumstances, at a site where music performance and motion-picture playback are performed.

Still another feature of the present invention resides in that the motion-picture data read out by the above-described playback control are output to the display device after being mixed with separately-input motion-picture data. In this case, motion-picture data output from, for example, a video player may be used as the separately-input motion-picture data, thereby enabling output of a motion picture that provides an enhanced display effect.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENT

A preferred embodiment of the present invention will be described with reference to the drawings. The following embodiment is a mere illustrative example, and may be modified in various manners without departing from the spirit of the present invention.

[Hardware Configuration]

Figure 1:
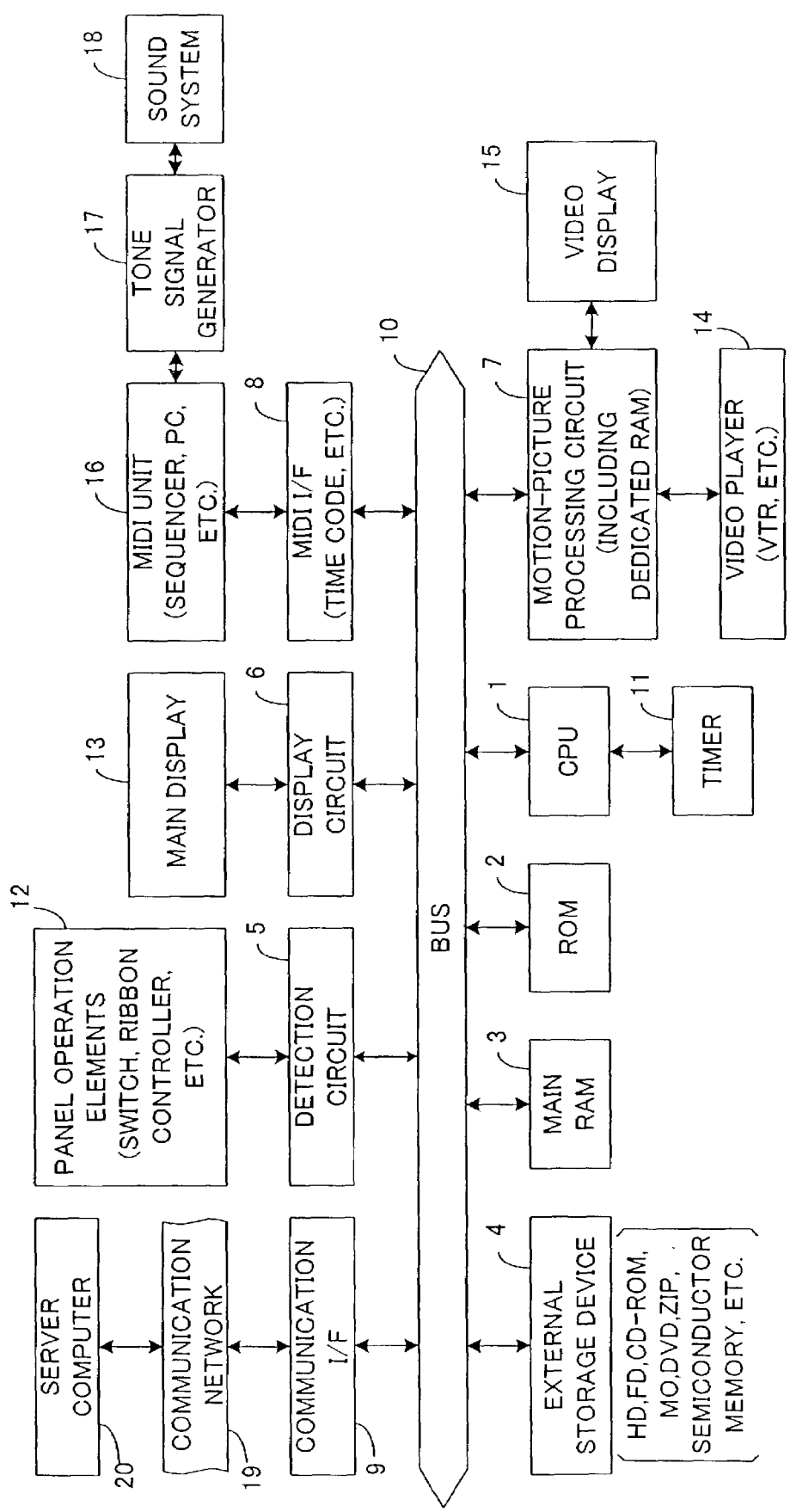
FIG. 1 is a block diagram showing a hardware configuration of a motion-picture time-scale control instruction system according to an embodiment of the present invention.

FIG. 1 is a block diagram showing the hardware configuration of a motion-picture time-scale control instruction system according to the embodiment of the present invention. This system is configured in such a manner that various types of processing, including motion-picture time scale control instruction, are performed by use of a personal computer (PC). In addition to components of the PC, such as a central processing unit (CPU) 1, read-only memory (ROM) 2, main random access memory (RAM) 3, an external storage device 4, a detection circuit 5, and a display circuit 6, the system includes a motion-picture processing circuit 7, a MIDI interface (MIDI I/F) 8, and a communication interface (communication I/F) 9, which are interconnected via a bus 10.

In accordance with a predetermined software program, the CPU 1, which controls the entire system, performs various types of control and manages various types of processing, such as motion-picture time scale control instruction to be described later, while utilizing time measurement performed by a timer 11. The ROM 2 stores predetermined control programs for controlling the system. These control programs include programs that manage not only basic data processing, but also other types of processing such, as the motion-picture time scale control instruction according to the present invention. In addition to the programs, the ROM 2 stores various tables and various data sets used in the various types of processing. The MAIN RAM 3 serves as a temporary storage section for storing data and parameters required in the various types of processing.

The external storage device 4 is composed of a hard disk drive (HDD) or an apparatus which utilizes a portable storage medium such as a compact disk read-only memory (CD-ROM), a flexible disk (FD), a magneto-optical (MO) disk, a digital versatile disk (DVD), a ZIP disk, or a semiconductor memory. The external storage device 4 can store various control programs and various data. Accordingly, programs and various data necessary for the motion-picture time scale control instruction, etc. can be loaded into the RAM 3 not only from the ROM 2, but also from the external storage device 4. Further, processing results can be recorded on the external storage device 4.

A panel operation-element unit 12 is connected to the detection circuit 5. The panel operation-element unit 12 includes various switches and keys, and other types of operation elements. These operation elements are also called "panel operation elements" and are used by a user to provide the system with data relating to various instructions and various types of setting; e.g., setting of motion-picture playback mode, for the motion-picture time scale control instruction. For example, mode switches (M1, M2) are provided in order to switch the motion-picture playback mode; and a ribbon controller (a linear-operation-type pad operation element for detecting a single-dimensional position of a position at which an operation finger is in contact with the operation element) is provided as a real-time operation element for controlling the playback speeds of a piece of music and a motion picture in real time.

The display circuit 6 controls the display statuses of a display 13, constituted by an LCD or any other suitable device, and various indicators. The user performs setting and inputs instructions in relation to the motion-picture time scale control instruction, by operating the operation elements of the panel operation-element unit 12 while viewing the display 13. The above-described components 1–6 and 10–13 constitute a main system (or a main PC).

The motion-picture processing circuit 7 includes dedicated RAM. A video playback unit 14 such as a VTR or a video-disk player, and a video display 15 having a relatively large screen such as a CRT or a projector are connected to the motion-picture processing circuit 7. The motion-picture processing circuit 7 processes a video signal (motion-picture video signal) from the video playback unit 14 to thereby play back motion picture data at a predetermined playback speed and displays images on the video display 15 on the basis of the motion picture data. The motion-picture processing circuit 7, the video playback unit 14, and the video display 15 constitute a motion-picture playback system. Notably, the input section of the motion-picture processing circuit 7 includes an A/D converter; and an analog video signal output from the video playback unit 14 is converted to a digital video signal (motion picture data) at the input section. In the motion-picture processing circuit 7, various types of processing are performed on the digital motion-picture data. Further, the output section of the motion-picture processing circuit 7 includes a D/A converter; and the digital motion picture data processed in the motion-picture processing circuit 7 are converted to an analog video signal, which is then sent to the video display 15.

A MIDI unit 16 constituted by a sequencer or a personal computer and adapted to generate music data is connected to the MIDI interface 8. A tone signal generator 17 is connected to the MIDI unit 16. The tone signal generator 17 generates a tone signal on the basis of the music data supplied from the MIDI unit 16 and outputs the generated tone signal. A sound system 18 including a digital signal processor (DSP) and speakers is connected to the tone signal generator 17. The sound system 18 imparts various musical effects to the tone signal supplied from the tone signal generator 17 and generates a musical sound corresponding to the tone signal imparted with the musical effects. The MIDI unit 16 can output to the tone signal generator 17 not only music data stored therein, but also music data stored in, for example, the ROM 2 and the external storage device 4. Therefore, the sound system 18 generates musical sounds corresponding to tone signals generated on the basis of the music data stored in the ROM 2 and the external storage device 4.

The music data are automatic performance data in a standard MIDI file (SMF) format, and the MIDI unit 16 reproduces the automatic performance data. When music data (automatic performance data) are played back, the tempo of playback is controlled in accordance with instructions contained in the music data, such as time codes and tempo clocks (MIDI clocks) or in accordance with instructions from real-time operation elements of the panel operation-element unit 12. The MIDI unit 16, the tone signal generator 17, and the sound system 18 constitute a music performance system. Notably, the time codes are timing signals which are provided regularly, with reference to the absolute time, from the start of playback of automatic performance data, and each timing signal includes time data (hour, minute, and second) representing the time from the start of playback of the automatic performance data. Further, the tempo clocks are timing signals which are provided at regular time intervals corresponding to the tempo of a piece of music; e.g., at intervals equal to $1/24$ of a time period corresponding to a quarter note.

The communication interface (I/F) 9 is connected to a server computer 20 or a like computer via a communication network 19 such as a local area network (LAN), the Internet, or a phone line, in such a manner that the communication interface 9 can communicate with the server computer 20 or the like. Therefore, control programs and various data such as music data can be downloaded from the server computer 20 or the like to the external storage device 4.

Notably, although the system shown FIG. 1 uses the main PC, the main system and the music performance system may be replaced with any other information processing unit which has similar processing functions, such as an electronic musical instrument or an automatic performance unit; and the motion-picture playback system may be connected to the information processing unit in order to constitute the motion-picture time-scale control instruction system.

[Motion-Picture Playback System]

Figure 2:
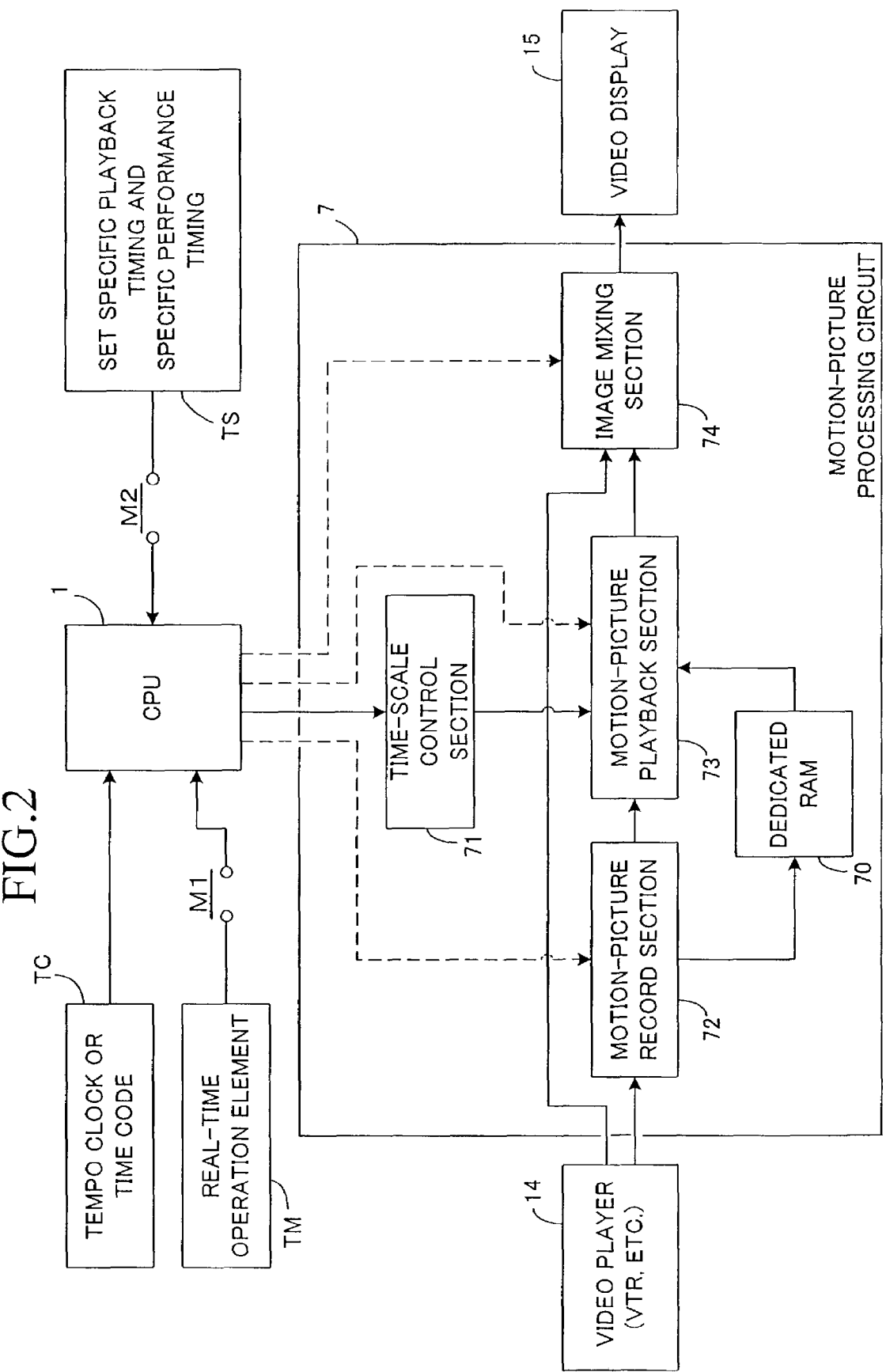
FIG. 2 is a block diagram showing the motion-picture processing function of the motion-picture time-scale control instruction system according to the embodiment of the present invention.

FIG. 2 is a block diagram showing the motion-picture processing function of the motion-picture playback system according to the embodiment of the invention. The motion-picture processing circuit 7 includes dedicated RAM 70 used for motion-picture processing only; a time-scale control section 71; a motion-picture record section (video sampler) 72; a motion-picture playback section 73; and an image mixing section 74.

The motion-picture playback system according to the present embodiment will be described briefly with reference to FIG. 2. Motion-picture data are previously stored in the motion-picture storage RAM 70. In a certain mode (M1), during playback of a motion picture, the CPU 1 supplies to the time-scale control section 71 a time-scale control signal which is output from a tempo detection mechanism TC or TM and corresponds to the tempo of a piece of music which is being played back. The time-scale control section 71 controls the playback speed of motion-picture data in accordance with the time-scale control signal. The motion-picture playback section 73 reads out the motion-picture data from the RAM 70, while increasing and decreasing the read-out time for a unit of data, and outputs the read motion-picture data to the display 15. In a different mode (M2) for the case in which timing set (TS) for synchronizing the timing of playback of a specific frame of a motion picture with a specific music performance timing have previously been performed, a control system composed of the CPU 1, the time-scale control section 71, and the motion-picture playback section 73 reads motion-picture data of the specific frame from the RAM 70 at a playback timing which matches the specific music performance timing, on the basis of the information of timing set TS (hereinafter referred to as "timing set information TS"), and outputs the motion-picture data to the display 15.

Now, the motion-picture playback system will be specifically described. First, in accordance with an instruction from the CPU 1 of the main system, the motion picture record section 72 samples a video signal (motion-picture video signal) output from the video playback unit 14, such as a VTR, and stores the sampled video signal in the dedicated RAM 70 serving as a storage device for digital motion-picture data. That is, in response to an image recording start instruction from the panel operation-element unit 12, a video signal which is supplied from the video playback unit 14 to the motion-picture processing circuit 7 at that point in time is stored in a predetermined storage area of the dedicated RAM 70 as digital motion-picture data. A plurality of storage areas can be set in the dedicated RAM 70, and a plurality of sets of digital motion-picture data can be stored. Notably, as described above, the video signal (motion-picture video signal) processed at the motion-picture processing circuit 7 is a digital signal which is converted from an analog video signal at the unillustrated input section. Therefore, the motion-picture record section 72 writes a digital video signal in the dedicated RAM 70 as digital motion-picture data. Further, at the time of writing of the digital motion-picture data, in order to reduce the volume of data to be stored in the dedicated RAM 70, the motion-picture record section 72 compresses the digital motion-picture data before storing the data in the dedicated RAM 70.

At the time of playback of the motion-picture data, the CPU 1 instructs the motion-picture processing circuit 7 to play back the motion-picture data in various manners. For example, a plurality of motion-picture selection switches corresponding to a plurality of motion-picture data sets stored in the dedicated RAM 70 are disposed on the panel operation-element unit 12. In response to operation of any of the motion-picture selection switches, the CPU 1 instructs the motion-picture processing circuit 7 to start playback of a corresponding motion-picture data set.

Alternatively, playback of the motion-picture data can be instructed by means of music data reproduced by the MIDI unit 16. The MIDI standard includes an MIDI machine control (MMC) standard for controlling a digital recorder or a VTR. When such an MMC is used, one motion-picture data set is selected from among a plurality of motion-picture data sets in accordance with a locate command, and playback of the selected motion-picture data set is started in accordance with a deferred-play command. Notably, the locate command is a command for designating the position of the motion-picture data set to be played back from among a plurality of motion-picture data sets. Further, the deferred-play command is a command for designating a timing of starting playback of the selected motion-picture data.

When a predetermined motion-picture data set is desired to be played back in synchronism with playback of music data, a locate command and a deferred-play command are disposed in the music data at positions corresponding to desired timings. When the music data are played back by the MIDI unit 16, the locate command and the deferred-play command are read out at respective timings and supplied to the CPU 1 via the MIDI interface 8. The CPU 1 controls the motion-picture processing circuit 7 to select a set of motion-picture data in accordance with the locate command and to start playback of the selected motion-picture data in accordance with the deferred-play command.

At the time of playback of motion-picture data, in accordance with such instructions from the CPU 1, the motion-picture playback section 73 selects a desired motion-picture data set from among a plurality of sampled motion-picture data sets stored in the dedicated RAM 70. The thus-selected motion-picture data set is read at a predetermined speed and played back successively under control by the time-scale control section 71. Notably, when the compressed motion-picture data are stored in the dedicated RAM 70 as described above, the motion-picture playback section 73 decompresses the motion-picture data read out from the dedicated RAM 70. The time-scale control section 71 has a function of controlling the motion-picture playback section 73 on the basis of timing set information TS or music-tempo designating information and in accordance with control inputs which are supplied from the CPU 1 in accordance with a playback mode (M1, M2), to thereby control playback of the motion picture.

Specifically, on the basis of the tempo designating information or timing set information TS from the CPU 1, the time-scale control section 71 provides an instruction to the motion-picture playback section 73 so as to play back motion-picture data at a playback speed which matches the progress of a piece of music that is currently being performed. The motion-picture playback section 73 successively reads out the motion-picture data from the dedicated RAM 70 at the designated playback speed to thereby play back the motion picture. Notably, the control of the motion-picture playback speed on the basis of the tempo designating information and the timing set information TS will be described later in detail.

In accordance with an instruction from the CPU 1, the motion-picture playback section 73 can use "looped playback" for repeatedly playing back a portion or the entirety of a motion-picture data set selected from those stored in the dedicated RAM 70. The present embodiment enables looped playback in a seamless manner and without any failure (omission of image frames or generation of blank frames).

The motion-picture data played back at the motion-picture playback section 73 are supplied to the video display 15 via the image mixing section 74, whereby the motion picture is displayed on the screen of the video display 15 at the predetermined playback speed. In the present embodiment, the image mixing section 74 receives motion-picture data (as a main image, for example) which are played back at a controlled playback speed in the motion-picture playback section 73 and motion-picture data (as a background image, for example) which are played back in real time in the video playback unit 14 and composites them. With this operation, an image resulting from the composition of the two motion-picture data sets is displayed on the video display 15. Notably, a signal supplied to the video display 15 is an analog image signal which is converted from a digital image signal by the D/A converter provided in the unillustrated output section as described above.

Further, if necessary, the image mixing section 74 may employ any one of various methods for mixing images (color images) in order to attain various display effects; e.g., simply superposing the played back motion picture having been output from the motion-picture playback section 73 and having undergone time-scale control on the real-time motion picture output from the video playback unit 14; providing cross fade to these motion pictures; obtaining the logical sum or logical product of the played back motion picture and the real-time motion picture, and displaying the respective motion pictures in different display areas and changing the display areas.

[Playback Mode 0]

In the motion-picture time scale control instruction system, the motion-picture processing circuit 7 can be operated in a playback mode 0. In the playback mode 0, the motion-picture playback speed is changed on the basis of tempo designating information TC, represented by, for example, tempo clocks (MIDI clocks) or time codes of music data, (shown in the upper left corner of FIG. 2). That is, when music data are played back, the CPU 1 receives tempo designating information in the form of the differential values of time codes (the time intervals of the time codes) or the time intervals of tempo clocks (MIDI clocks); detects a change in the tempo of the performed piece of music; and informs the time-scale control section 71 of the detected change. The time-scale control section 71 controls the motion-picture playback at the motion-picture playback section 73 on the basis of the tempo designating information supplied from the CPU 1 as a control input.

Figure 3:
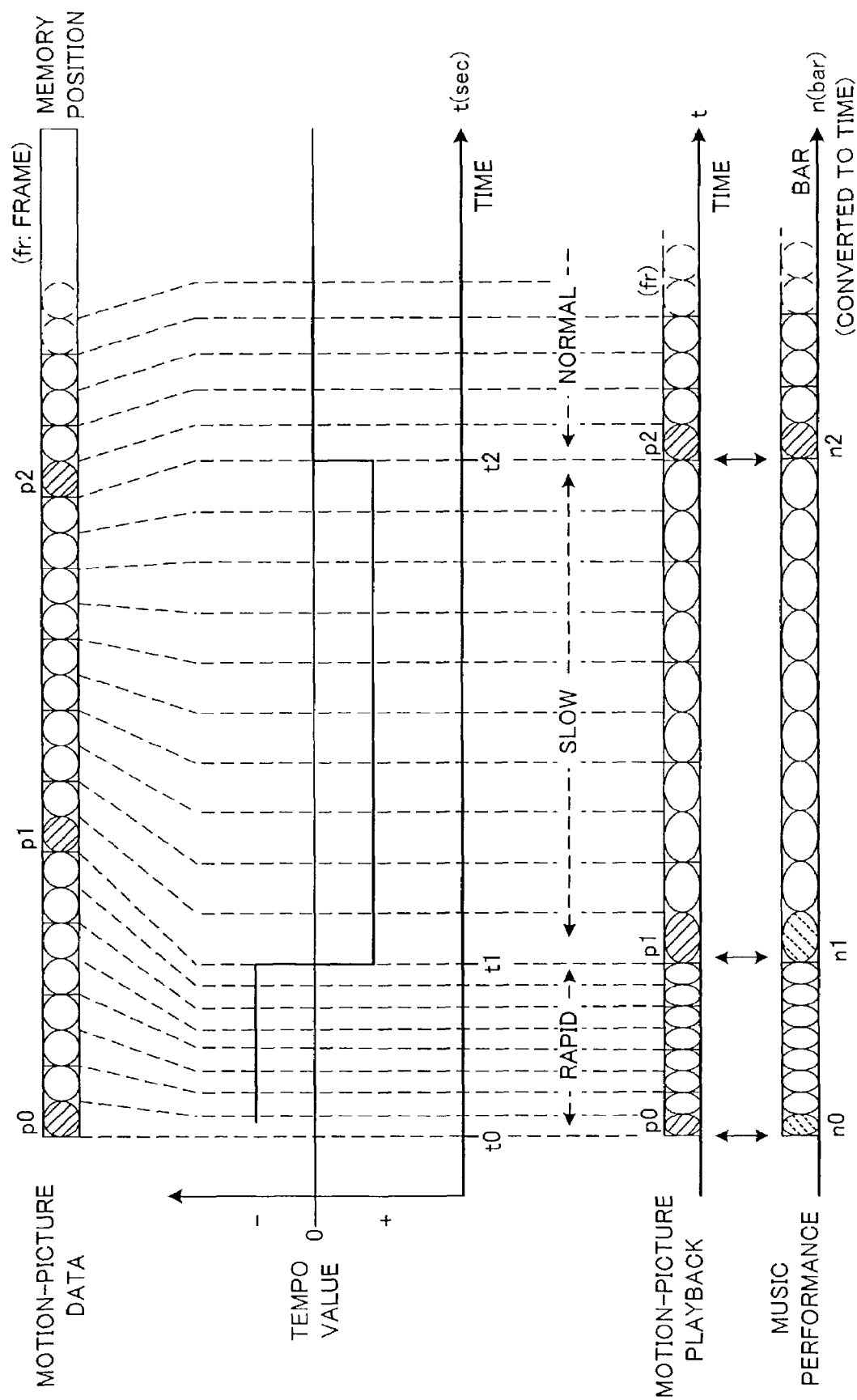
FIG. 3 is a time chart showing an example operation of the motion-picture time-scale control instruction system in a playback mode 0 in which playback speed of a motion picture is changed in accordance with tempo designating information.

FIG. 3 is a time chart for schematically showing operation in the playback mode 0 in which read-out speed of motion-picture data changes in accordance with the tempo designation. In FIG. 3, each circle represents a unit of motion-picture data (including a predetermined number of frames; hereinafter simply referred to as a "section") or a unit of music data (including a predetermined number of bars, cadences, or ticks, where the number is not limited to an integer and may be any number having a decimal part; hereinafter simply referred to as a "section"). The width of each circle represents the time over which data of the corresponding section are played back, thereby visually showing changes in the playback density of data with time. Notably, the number of ticks represents a number of unit time intervals which represent a time resolution of a sequencer.

The uppermost row of FIG. 3 represents the motion-picture data stored in the RAM 70 dedicated for motion-picture playback. The second row represents changes in a tempo value with elapsed time t (sec), wherein the tempo value is changed on the basis of tempo designating information represented by, for example, tempo clocks. The origin of the vertical indicated by "0" represents a standard tempo value (e.g., tempo value=120).

When the music performance system 16–18 starts performance of a piece of music in accordance with music data, motion-picture playback is performed at a speed corresponding to a tempo value designated by the tempo designating information. In an example case in which the tempo designating information of the music data designates a tempo value corresponding to "0" (standard tempo value=120), the motion-picture processing circuit 7 operates in such a manner that, in accordance with an instruction from the CPU 1, the motion-picture data stored in the dedicated RAM 70 are read out by the time-scale control section 71 and the motion-picture playback section 73 at an ordinary motion-picture playback speed; e.g., 30 frames/sec.

When the designated tempo value changes from the standard tempo value corresponding to "0," the changed tempo value is output from the CPU 1, and the music performance and the motion-picture playback are formed on the basis of the changed tempo value. Notably, the tempo designating information can be obtained from the time intervals of tempo clocks, the differential values of time codes (the time intervals of the time codes), or other data.

Accordingly, in the playback mode 0, when the tempo value changes as shown in the second row of FIG. 3, the music data are played back in accordance with the changed tempo value (at a tempo which has been increased or decreased from the standard tempo), as shown in the lowermost row. Simultaneously, the read-out speed of the motion-picture data is increased or decreased from the ordinary motion-picture playback speed by an amount corresponding to the change in the tempo value, so that, as shown in the third row, the motion-picture data are played back at a speed corresponding to the tempo value. Thus, there can be attained a stage effect in which playback of the motion picture is synchronized with performance of music. In some types of music data, such as SMF, tempo information can be disposed at locations at which the tempo value is to be changed. When such music data are played back, tempo information is extracted at corresponding timings, and the tempo value is changed. That is, performance of a piece of music and playback of a motion picture can be controlled simultaneously.

[Playback Mode 1]

In the motion-picture time scale control instruction system, when the mode switch M1 of the panel operation-element unit 12 (see FIG. 2) is operated, the motion-picture processing circuit 7 operates in a playback mode 1. In the playback mode 1, during performance of a piece of music, the CPU 1 receives tempo change (manipulation) information TM produced upon operation of the real-time operation element, detects that the tempo of the performed piece of music has been changed, and communicates the tempo change (manipulation) information to the time-scale control section 71. On the basis of the tempo change (manipulation) information, which have been supplied from the CPU 1 as a control input, the time-scale control section 71 controls the motion-picture playback performed at the motion-picture playback section 73.

Figure 4:
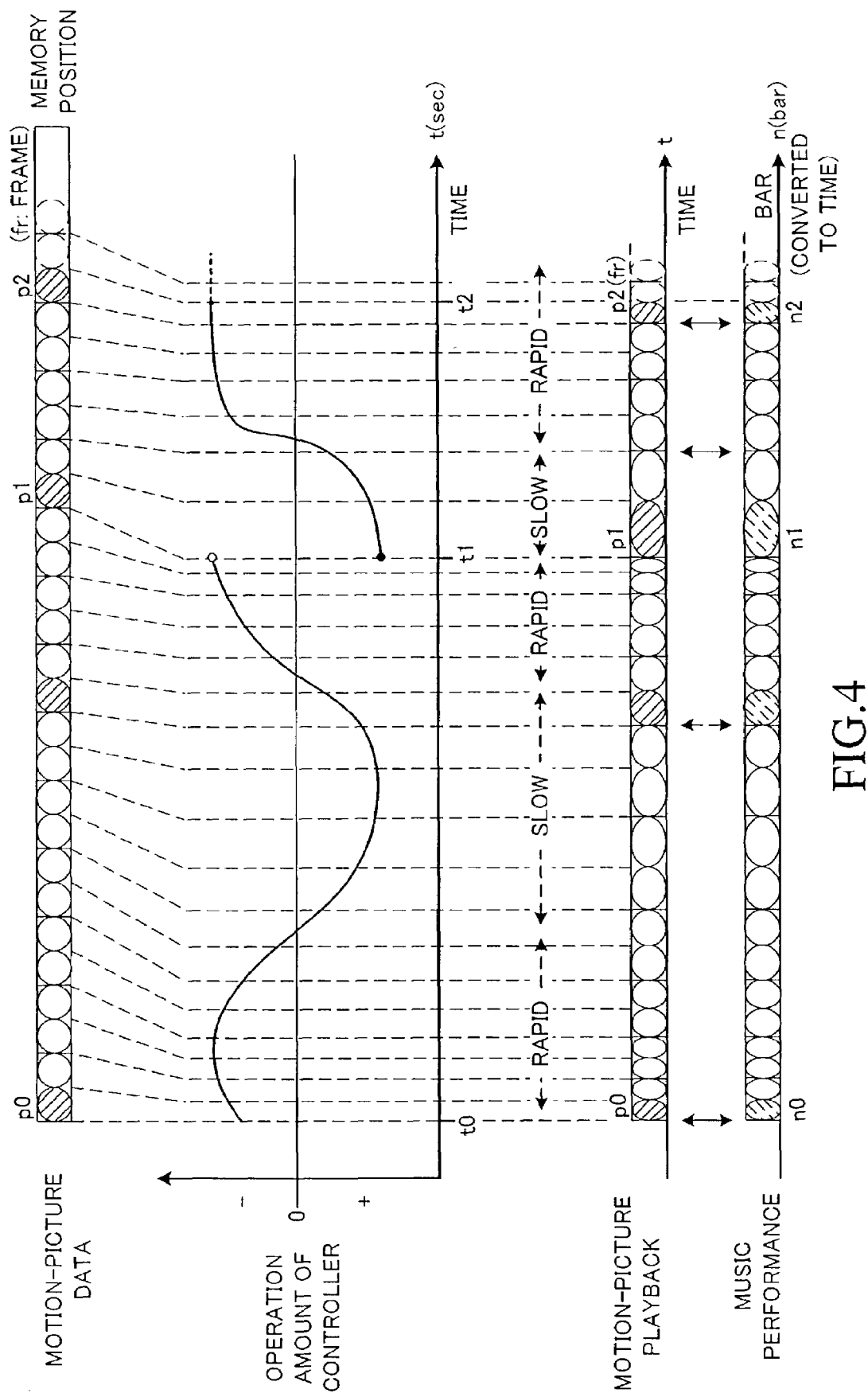
FIG. 4 is a time chart showing an example operation of the motion-picture time-scale control instruction system in a playback mode 1 in which playback speed of a motion picture is changed in accordance with operation of a ribbon controller.

FIG. 4 is a time chart for schematically showing operation in the playback mode 1 in which read-out speed of motion-picture data changes in accordance with an operation of changing the tempo. In FIG. 4 as well, each circle represents a unit of data as described above. As has been described, a ribbon controller (a real-time operation element for detecting a single-dimensional contact position) is provided on the panel operation-element unit 12 in order to change the tempo for music performance in real time. The uppermost row of FIG. 4 represents the motion-picture data stored in the RAM 70 dedicated for motion-picture playback. The second row represents changes in operation amount of the ribbon controller with elapsed time t (sec). The origin of the vertical indicated by "0" represents the origin position of the ribbon controller.

When the operator brings his finger in contact with the origin position of the ribbon controller, the music performance and the motion-picture playback are performed at a speed corresponding to the origin position "0." Specifically, when we assume that the standard tempo value=120, the music performance system 16–18 performs a piece of music at a tempo of 120, which corresponds to the origin position. Specifically, the CPU 1 generates a tempo clock signal corresponding to the tempo of 120, and supplies it to the MIDI unit 16. The MIDI unit 16 plays back the music data in synchronism with the supplied tempo clock signal. Further, the motion-picture processing circuit 7 operates in such a manner that, in accordance with an instruction from the CPU 1, the motion-picture data stored in the dedicated RAM 70 are read out by the time-scale control section 71 and the motion-picture playback section 73 at an ordinary motion-picture playback speed; e.g., 30 frames/sec.

When the operator brings his finger in contact with an arbitrary position of the ribbon controller, an operation amount corresponding to the position of the finger (a displacement from the origin position "0") is output from the CPU 1, and the music performance and the motion-picture playback are performed at a speed corresponding to the operation amount output from the CPU 1. Accordingly, when the ribbon controller is operated as shown in the second row of FIG. 4, the MIDI unit 16 reproduces the music data at a tempo which has been increased or decreased from the standard tempo by an amount corresponding to the (positive or negative) operation amount of the ribbon controller, as shown in the lowermost row. Simultaneously, the read-out speed of the motion-picture data is increased or decreased from the ordinary motion-picture playback speed by an amount corresponding to the (positive or negative) operation amount of the ribbon controller, so that, as shown in the third row, the motion-picture data are played back at a speed corresponding to the operation amount of the ribbon controller. Thus, the playback of the motion picture can be synchronized with performance of music.

FIG. 4 shows an example operation. As shown in the second row, simultaneously with the start of music performance and motion-picture playback at time t0, the operator starts the operation of the ribbon controller. The operator slides his finger toward the positive direction and then toward the negative direction, and slides the finger toward the positive direction again, while passing through the origin position "0." Subsequently, at time t1, the operator stops the operation at a certain positive position, then jumps to a certain negative position, and then slides his finger toward the positive direction again. Subsequently, at time t2, the operator stops the operation at a certain positive position (the operator moves his finger away from the ribbon controller).

In this case, the music data are played back in a manner shown in the lowermost row of FIG. 4. Specifically, playback of music data of the first section (defined by the number of bars, cadences, or ticks) n0 is started at time t0. When the operator moves his finger away from the controller at time t1 and then brings the finger into contact with the controller, playback is resumed from music data of the section n1 at a speed corresponding to a certain negative position at which the operator brings the finger into contact with the controller. When the operator stops the operation at time t2 after playback of the music data of the section n2, playback of the music data is continued after time t2 at a speed corresponding to the operation amount in effect at the time the operation has been stopped.

As shown in the third row of FIG. 4, the playback speed of the motion-picture data is controlled in the same manner as that for the music data. Specifically, at time t0, in response to the controller operation at the certain positive position, motion-picture data of the first section (defined by the number of frames) p0 is played back at a relatively high speed ("rapid"). Subsequently, playback of the motion-picture data is continued, while the playback speed is changed to "slow" and "rapid" speeds successively in accordance with the controller operation. When the operator jumps his finger to the certain negative position at time t1, the motion-picture data of the section p1 are played back at a "slow" playback speed corresponding to the jumped position. Subsequently, the playback speed is increased gradually in accordance with the controller operation. When the operator stops the operation at time t2 after playback of the motion-picture data of the section p2, playback of the motion-picture data is continued at a "rapid" speed corresponding to the operation amount, because the operation amount in effect at the time the operation has been stopped is maintained after time t2.

Accordingly, like the playback speed of the music data, the playback speed of the motion-picture data is decreased and increased in accordance with the controller operation amount, so that the motion-picture data can be played back in synchronism with the progress of the music performance. Notably, as shown in the upper left portion of FIG. 2, in addition to the operation of changing motion-picture playback speed on the basis of tempo designating information TC of the music data, such as time intervals of tempo clocks or the differential values of time codes (the time intervals of the time codes), there is performed the operation of simultaneously changing the music performance speed and the motion-picture playback speed on the basis of the tempo change information generated upon real-time operation of the ribbon controller. Therefore, the stage effect of the music performance and the motion-picture playback can be enhanced.

[Playback Mode 2]

In the motion-picture time scale control instruction system, when the mode switch M2 of the panel operation-element unit 12 (see FIG. 2) is operated, the motion-picture processing circuit 7 operates in a playback mode 2. In the playback mode 2, as shown in the upper right portion of FIG. 2, during performance of a piece of music, the CPU 1 supplies to the time-scale control section 71 timing set information TS which represents a specific section of the music data and a specific section of the motion-picture data which are desired to be played back at the same timing.

On the basis of the timing set information TS, the time-scale control section 71 adjusts the motion-picture playback speed to be instructed to the motion-picture playback section 73 in such a manner that the specific section of the music data and the specific section of the motion-picture data are played back at the same timing. The motion-picture playback section 73 reads out the sampled motion-picture data from the dedicated RAM 70 at the instructed motion-picture playback speed.

FIGS. 5 to 9 are views schematically showing examples of time-scale conversion and are used for explanation of motion-picture playback in the playback mode 2. The uppermost rows of FIGS. 5 to 7 and the second row of FIG. 8 each represent music data used for music performance in the music performance system 16–18. In these drawings, the music data are shown along with performance time in consideration of tempo designation by time codes or tempo clocks (MIDI clocks). In this example, the music data are prepared in such a manner that the section n0 to the section just before the section n1 are played back at a faster tempo than are the sections n1 to n2, as shown by means of the widths of respective circles. Specifically, tempo information is disposed at the beginning of the section n1 of the music data. The MIDI unit 16 starts playback of music data, from the section n0, at an initial tempo designated by initial tempo information disposed in the music data. At the beginning of the section n1, the playback tempo is changed to a slower tempo designated by the tempo information disposed at the beginning of the section n1.

Figure 5:
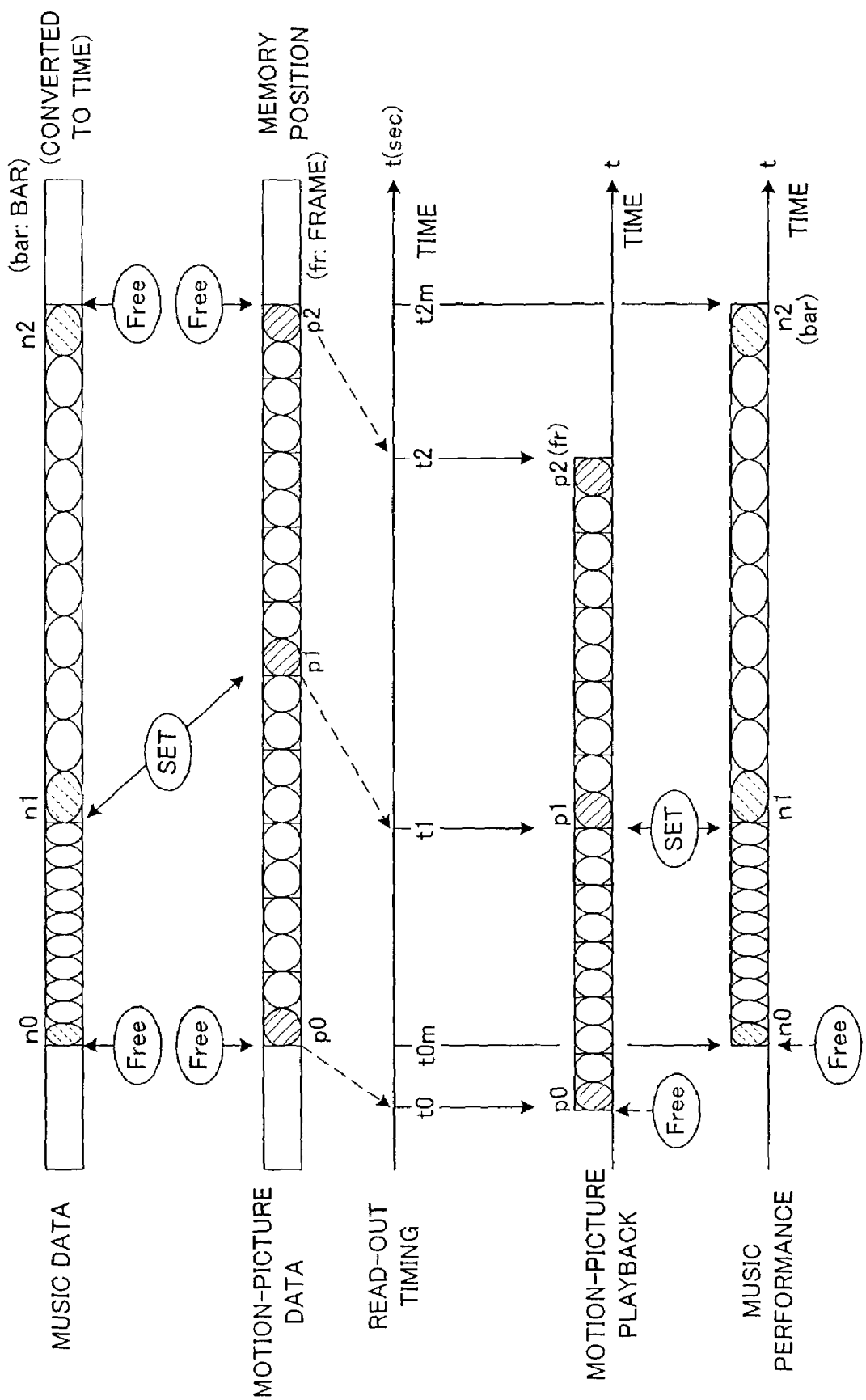
FIG. 5 is a time chart showing a first example operation of the motion-picture time-scale control instruction system in a playback mode 2 in which a single point is set for synchronization.
Figure 6:
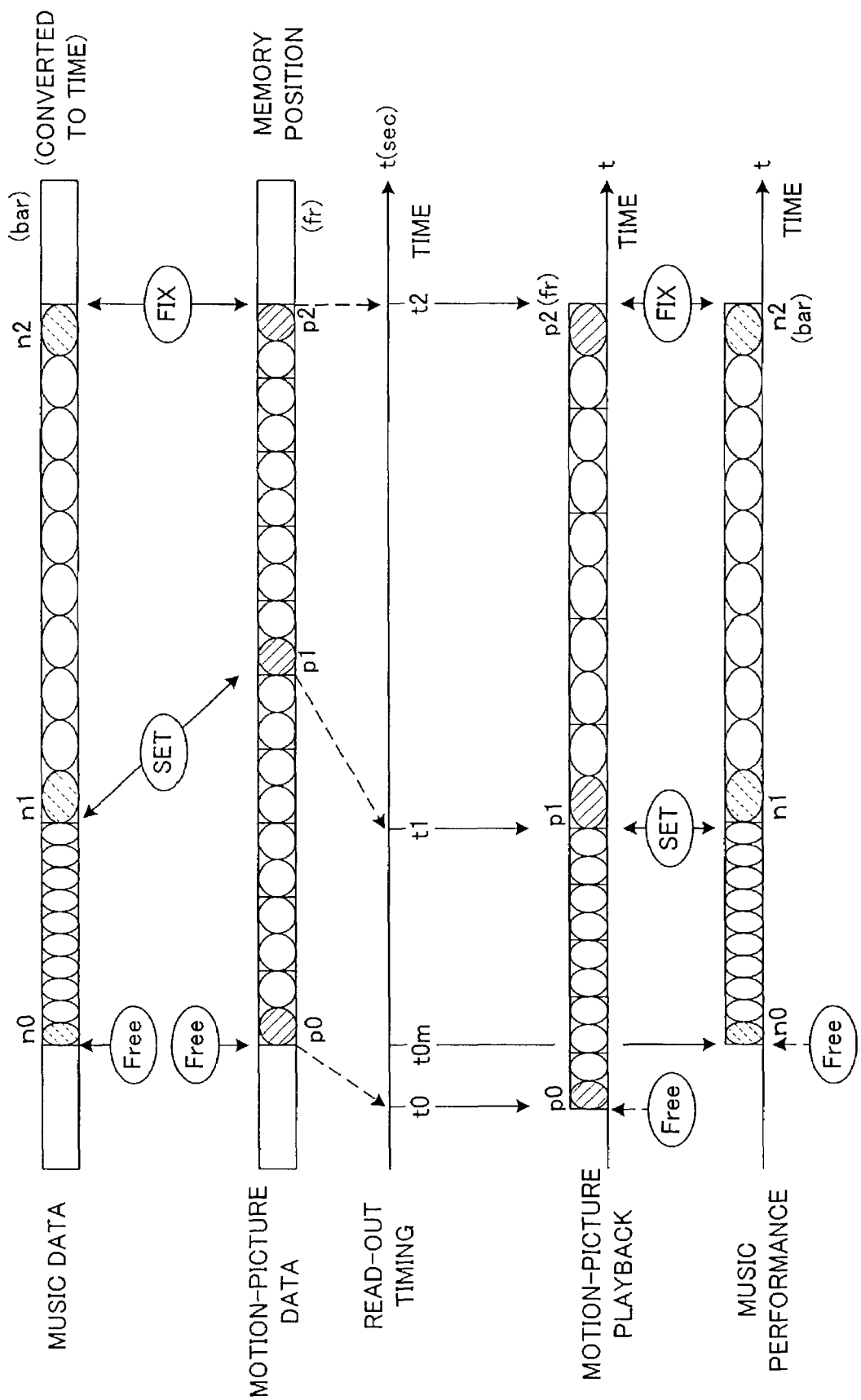
FIG. 6 is a time chart showing a second example operation of the motion-picture time-scale control instruction system in the playback mode 2 in which two points including an end point are set for synchronization.
Figure 7:
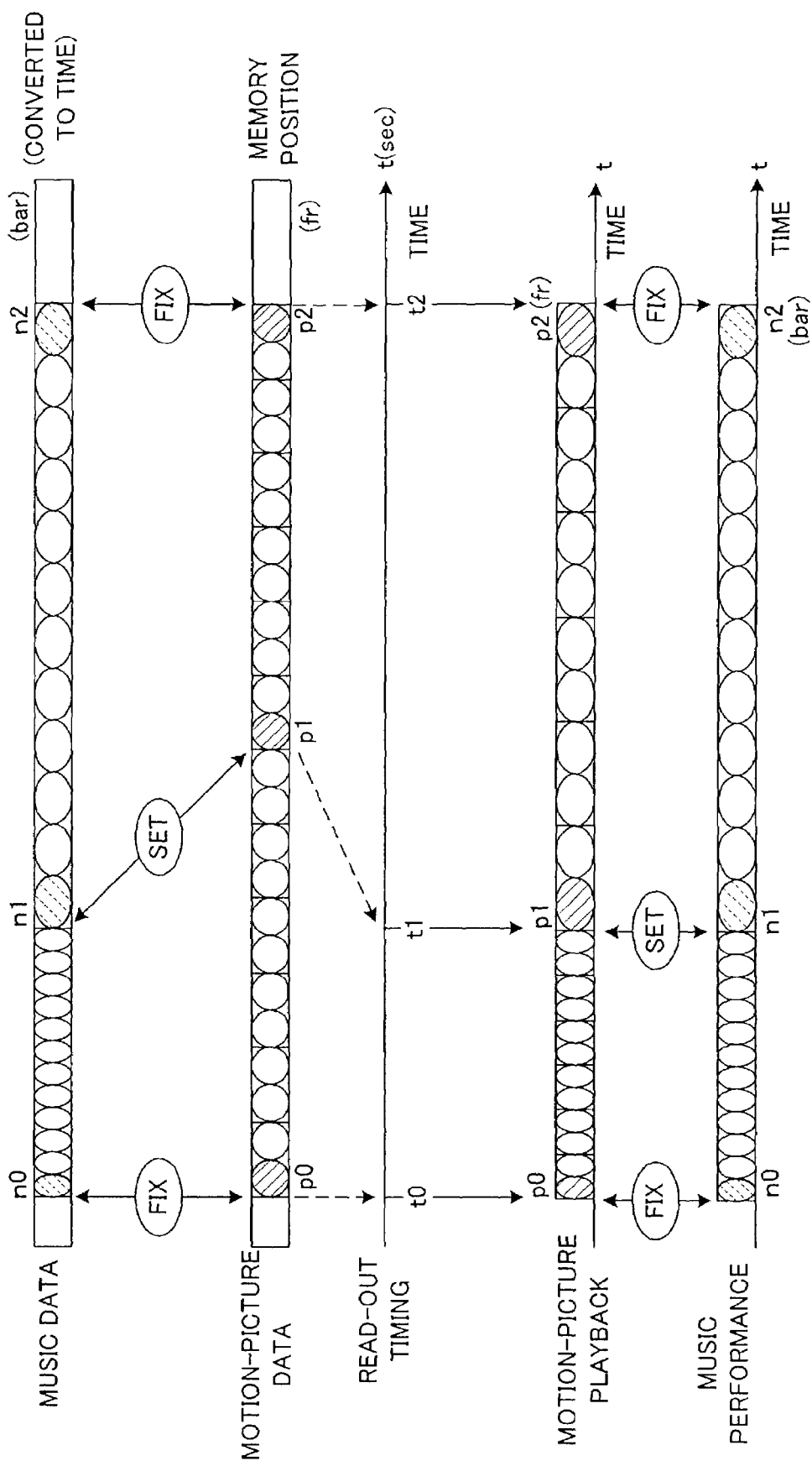
FIG. 7 is a time chart showing a third example operation of the motion-picture time-scale control instruction system in the playback mode 2 in which three points including start and end points are set for synchronization.
Figure 8:
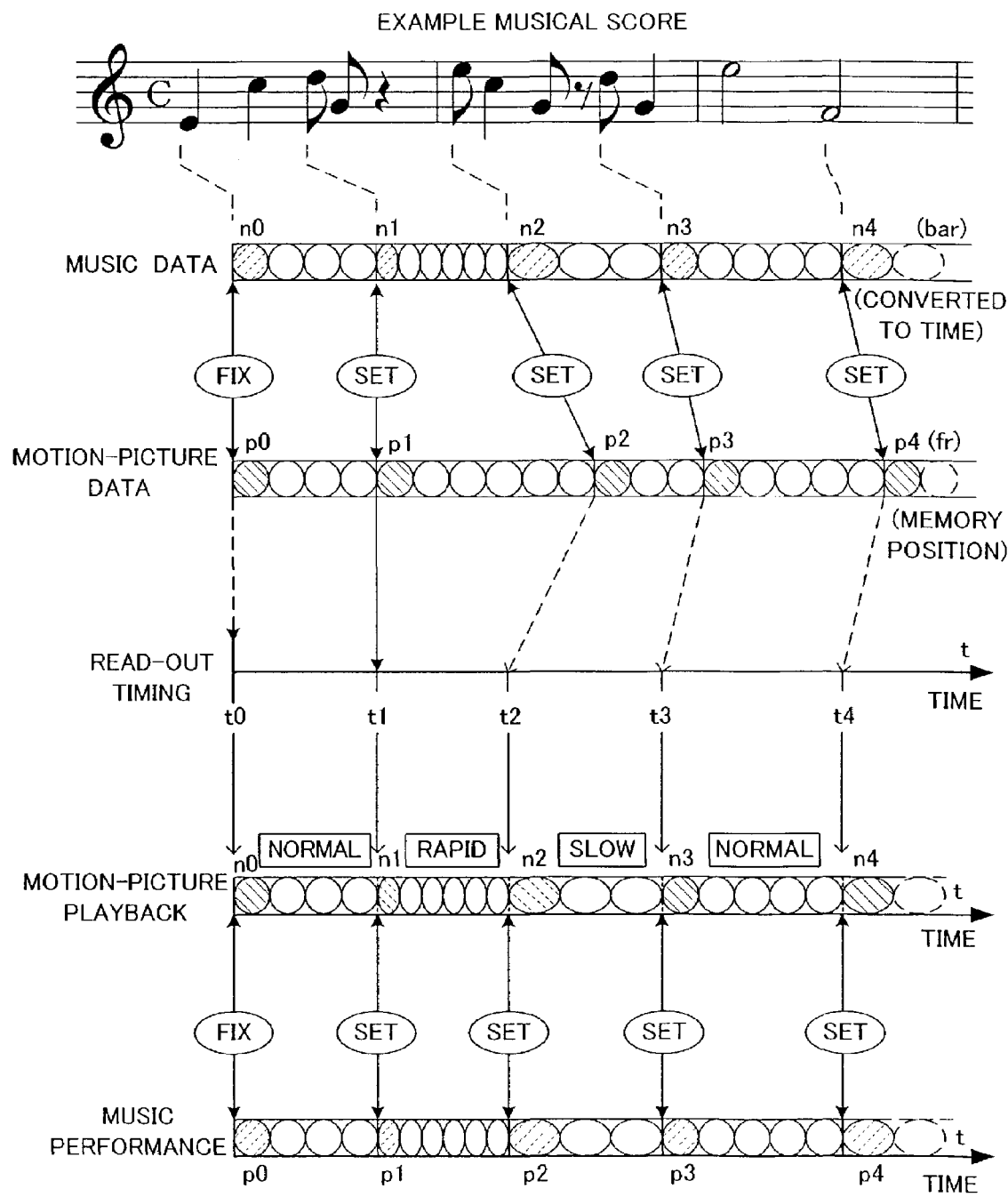
FIG. 8 is a time chart showing a fourth example operation of the motion-picture time-scale control instruction system in the playback mode 2 in a generalized condition.

The second rows of FIGS. 5 to 7 and the third row of the FIG. 8 each represent motion-picture data stored in the music-data dedicated RAM 70 of the motion-picture processing circuit 7. In order to simplify description, in FIGS. 5 and 7, the record positions of motion-picture data sets are rendered so as to correspond to the sections n0 to n2 of the music data. The timing of the above-described synchronization can be controlled through adjusting the location of a deferred-play command disposed in the music data. Further, as has been described in relation to FIGS. 3 and 4, each circle represents a data section (unit of data). In the case of music data, the unit of data is defined by the number of bars, cadences, or ticks, where the number is not limited to an integer and may be any number having a decimal part. In the case of motion-picture data, the unit of data is defined by the number of frames.

FIG. 5 shows an example of time-scale conversion for the case in which timing set information (TS) is used in order to synchronize a certain section of the motion-picture data with a certain section of the music data. This time-scale conversion is preferably used so as to attain a stage effect in which the motion picture and the piece of music are synchronized at one or a plurality of positions. In the present example, as shown in the uppermost and second rows, the timing set information is input in such a manner that the section p1 (the start point of the section p1) of the motion-picture data is synchronized with the section n1 (the start point of the section n1) of the music data ("SET"). The start and end positions p0 and p2 of the motion-picture data are not synchronized with the start and end positions n0 and n2 of the music data ("Free").

In this case, playback of the motion-picture data and playback of the music data are started at time t0 and time t0m, respectively. However, in the case of the motion-picture data, after start of playback at time t0, the time scale for playback of the motion-picture data is controlled in such a manner that playback of the motion-picture data section p1 is started at a specific time t1 at which playback of the music data section n1 having been set to be synchronized with the motion-picture data section p1 is started.

That is, the CPU 1 supplies the time-scale control section 71 with start time data representing the respective playback start times t0 and t0m of the first motion-picture data section p0 and the first music data section n0, as well as the specific time data which represent the specific time t1 at which playback of the music data section n1 having been set to be synchronized with the specific motion-picture data section p1 is started. Upon receipt of these time data, the time-scale control section 71 controls the motion-picture playback section 73 in such a manner that playback of the first motion-picture data section p0 is started at time t0, and playback of the specific motion-picture data section p1 is started at the specific time t1. The motion-picture playback section 73 calculates read-out speed of the motion-picture data during a period from time t0 to t1 and starts playback of the first motion-picture data section p0 at time t0.

Further, the CPU 1 detects time t0m at which playback of the music data is to be started and instructs the MIDI unit 16 to start the playback. In response to the playback start instruction, the MIDI unit 16 starts playback of the music data, and supplies a tempo clock signal to the CPU 1 via the MIDI interface 8. On the basis of the supplied tempo clock signal, the CPU 1 corrects the reference time used in the time-scale control section 71. The "reference time" represents a timing which is used as a reference for detection of, for example, times such as t0, t1, t2, etc. Although the reference time has been measured continuously even before start of the music performance, after start of the music performance, the reference time is measured in synchronism with the music performance.

With the above-described operation, at the specific time t1, the specific motion-picture data section p1 is played back in synchronism with the specific music data section n1, which has been set to be synchronized with the specific motion-picture data section p1. The read-out speed of the motion-picture data is adjusted during the period of the unfixed (Free) playback start time t0 to the specific time t1. After the specific time t1, the motion-picture data are played back at a predetermined read-out speed, which has set for the motion-picture data in advance. Accordingly, as shown in FIG. 5, the end time t2 of playback of the motion-picture data does not necessarily coincide with the end time t2m of playback of the music data. Notably, the motion-picture data section p0 may be played back at the read-out speed set for the motion-picture data. As described above, in the present example, the playback timing of the motion-picture data is controlled in such a manner that the motion-picture data set at the specific position (n1) is played back at time t1 at which the music data set at the specific position (p1) is played back.

The example shown in FIG. 5 includes a single specific time t1. However, a plurality of positions in the motion-picture data may be set to be synchronized with an equal number of positions in the music data; and playback of the motion-picture data and playback of the music data may be synchronized with each other at the plurality of positions. In this case, the time scale (speed) of the motion picture is controlled during the period between the start of motion-picture playback and the first specific times, during the period between the first and second specific times, etc. The present example premises that the MIDI unit 16 generates the tempo clock signal by itself after the MIDI unit 16 starts playback in response to the playback instruction from the CPU 1. However, the CPU 1 and the MIDI unit 16 may be modified in such a manner that the CPU 1 rather than the MIDI unit 16 generates the tempo clock signal, and the MIDI unit 16 plays back the music data on the basis of the tempo clock signal supplied from the CPU 1. In this case, the CPU 1 controls the period of the generated tempo clock signal on the basis of the reference time in the motion-picture processing circuit 7 and the tempo information (disposed in the music data) played back at the MIDI unit 16.

FIG. 6 shows an example of time-scale conversion for the case in which timing set information (TS) is used in order to synchronize a certain section and the end section of the motion-picture data with a certain section and the end section of the music data. This time-scale conversion is preferably used so as to attain a stage effect in which the motion picture and the piece of music are synchronized at one or a plurality of intermediate positions and at the end position. In the present example, as shown in the uppermost and second rows, the timing set information is input in such a manner that the section p1 (the start point of the section p1) of the motion-picture data is synchronized with the section n1 (the start point of the section n1) of the music data ("SET"). Further, the playback end position (the end of the final section p2) of the motion-picture data is synchronized with the playback end position (the end of the final section n2) of the music data ("SET" & "FIX"). The motion-picture data section p0 at the start position is not synchronized with the music data section n0 at the start position ("Free").

Here, "SET" means a setting for synchronizing a certain portion of the motion-picture data with a certain portion of the music data. Further, "FIX" means a setting for controlling the system so as to play back a certain portion of the motion-picture data and a certain portion of the music data at a specific time on the reference time scale. Accordingly, the "certain portion" for which the "FIX" has been set is fixed to a "predetermined time" on the reference time scale. For example, even when a certain section or the timing of playback of a certain portion to be played back is edited, the timing of playback of the portion for which "FIX" has been set is still fixed to the "predetermined time" (i.e. is adjusted to be fixed to the predetermined time). Notably, in FIGS. 6 to 8, the setting "SET" is provided at each of the positions labeled "FIX."

In the case of FIG. 6 as well, playback of the motion-picture data and playback of the music data are started at arbitrary time t0 and time t0m, respectively. However, in the case of the motion-picture data, after start of playback at time t0, the time scale for the playback of the motion-picture data is controlled in such a manner that playback of the motion-picture data section p1 is started at a specific time t1 at which playback of the music data section n1 having been set to be synchronized with the motion-picture data section p1 is started. Subsequently, the time scale for playback is controlled even after the specific time t1 in such a manner that playback of the motion-picture data sections p1 to p2 is synchronized with playback of the music data sections n1 to n2.

That is, the CPU 1 supplies the time scale control section 71 with start time data representing the respective playback start times t0 and t0m of the first motion-picture data section p0 and the first music data section n0, the specific time data which represent the specific time t1 at which playback of the music data section n1 having been set to be synchronized with the specific motion-picture data section p1 is to be started, and end time data representing the playback end time t2 at which playback of the final motion-picture data section p2 and playback of the final music data section n2 are to end. Upon receipt of these time data, the time scale control section 71 controls the motion-picture playback section 73 in such a manner that playback of the first motion-picture data section p0 is started at time to, playback of the specific motion-picture data section p1 is started at the specific time t1, and playback of the final motion-picture data section p2 ends at the end time t2. The motion-picture playback section 73 calculates a first read-out speed for a period from time t0 to t1 and a second read-out speed for a period from time t1 to t2. The motion-picture playback section 73 plays back the first motion-picture data section p0 at the calculated first speed from time t0, and after the specific time t1, the motion-picture playback section 73 successively plays back the motion-picture data sections p1 to p2 at the calculated second speed.

With this operation, at the specific time t1, the specific motion-picture data section p1 is played back in synchronism with the specific music data section n1, which has been set to be synchronized with the specific motion-picture data section p1. In addition, even after the specific time t1, the motion-picture data is played back in synchronism with the music data up to the final section p2. Accordingly, as shown in FIG. 6, the playback speed of the motion-picture data is adjusted in a first manner in the period between the playback start point t0 and the specific time t1, for which synchronized operation is not set ("Free"), and in a second manner in the period between the specific time t1 and the playback end time t2, for which synchronized operation is set ("SET").

The example shown in FIG. 6 includes a single specific time t1. However, a plurality of positions in the motion-picture data may be set to be synchronized with an equal number of positions in the music data; and playback of the motion-picture data and playback of the music data may be synchronized with each other at the plurality of positions. Further, in the example illustrated in FIG. 6, playback of the motion-picture data and playback of the music data may be synchronized with each other in such a manner that playback of the motion-picture data and playback of the music data end simultaneously at end time t2. However, instead of synchronizing them at the end time t2 (by replacing "SET" at each end position with "Free"), playback of the motion-picture data and playback of the music data may be synchronized with each other in such a manner that the playback start time t0 of the motion-picture data is shifted to the playback start time t0m of the music data (by setting "SET" at each start position), whereby playback of the motion-picture data and playback of the music data are synchronized with each other only in the period between the common start time t0 and the specific time t1.

FIG. 7 shows an example of time-scale conversion for the case in which timing set information (TS) is used in order to synchronize the start section, an arbitrary intermediate section, and the end section of the motion-picture data with the start section, an arbitrary intermediate section, and the end section of the music data, respectively. This time-scale conversion is preferably used so as to attain a stage effect in which the motion picture and the piece of music are synchronized at the start position, at one or a plurality of intermediate positions, and at the end position. In particular, this time-scale conversion is preferably used so as to attain a stage effect in which the motion-picture data are played back in a looped or endless manner and in synchronism with the music data. In the present example, as shown in the uppermost and second rows, the playback start position (the start of the first section p0) and playback end position (the end of the final section p2) of the motion-picture data are synchronized with the playback start position (the start of the first section n0) and playback end position (the end of the final section n2) of the music data, respectively ("SET" & "FIX"). Further, the timing set information is input in such a manner that the section p1 (the start point of the section p1) of the motion-picture data is synchronized with the section n1 (the start point of the section n1) of the music data ("SET").

In this case, playback of the first motion-picture data section p0 and playback of the first music data section n0, which are related to each other, are started at a predetermined start time t0, respectively. Subsequently, the time scale for playback of the motion-picture data is controlled in such a manner that playback of the motion-picture data section p1 is started at a specific time t1 at which playback of the music data section n1 having been set to be synchronized with the motion-picture data section p1 is started. Subsequently, the time scale for playback is controlled even after the specific time t1 in such a manner that playback of the motion-picture data sections p1 to p2 is synchronized with playback of the music data sections n1 to n2.

That is, the CPU 1 supplies the time scale control section 71 with start time data representing the playback start time t0 at which playback of the first motion-picture data section p0 and playback of the first music data section n0 are to start, the specific time data which represent the specific time t1 at which playback of the music data section n1 having been set to be synchronized with the specific motion-picture data section p1 is to be started, and end time data representing the playback end time t2 at which playback of the final motion-picture data section p2 and playback of the final music data section n2 are to end. Upon receipt of these time data, the time scale control section 71 controls the motion-picture playback section 73 in such a manner that playback of the first motion-picture data section p0 is started at time t0, playback of the specific motion-picture data section p1 is started at the specific time t1, and playback of the final motion-picture data section p2 ends at the end time t2. The motion-picture playback section 73 calculates a first read-out speed to be employed for a period from time t0 to t1 and a second read-out speed to be employed for a period from time t1 to t2. The motion-picture playback section 73 plays back the first motion-picture data section p0 at the calculated first speed from time t0, and after the specific time t1, the motion-picture playback section 73 successively plays back the motion-picture data section p1 to p2 at the calculated second speed.

With this operation, at the playback start time t0, playback of the first motion-picture data section p0 is started in synchronism with the start of playback of the first music data section n0. At the specific time t1, the specific motion-picture data section p1 is played back in synchronism with the specific music data section n1, which has been set to be synchronized with the specific motion-picture data section p1. At the playback end time t2, playback of the final motion-picture data section p2 is ended in synchronism with the end of playback of the final music data section n2. In the example shown in FIG. 7, the tempo and the playback speed become fast during the period between the fixed playback start point to ("SET" and "FIX") and the specific time t1, and become slow during the period after the specific time t1.

The example shown in FIG. 7 includes a single specific time t1. However, a plurality of positions in the motion-picture data may be set to be synchronized with an equal number of positions in the music data; and playback of the motion-picture data and playback of the music data may be synchronized with each other at the plurality of positions.

Figure 9:
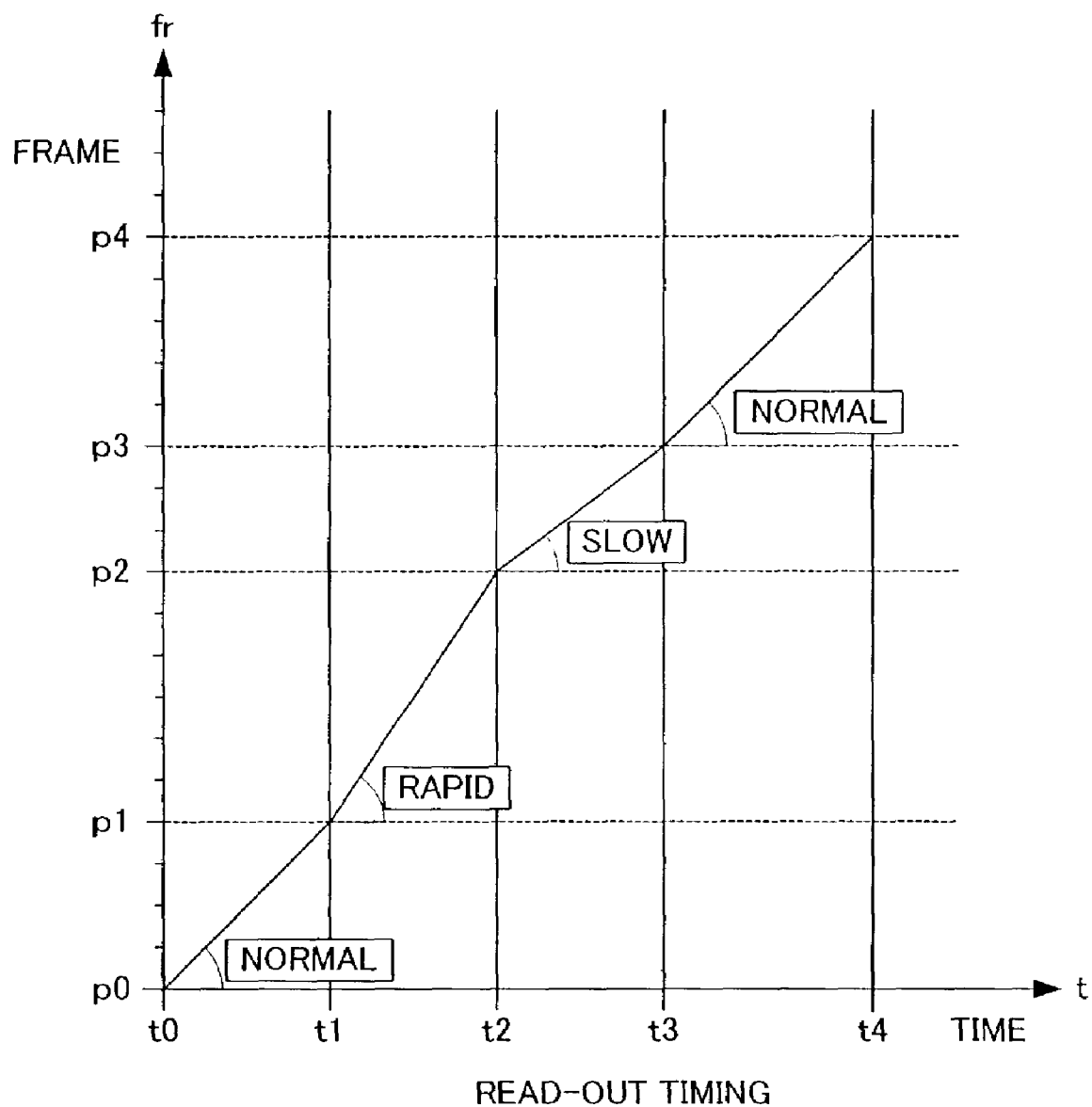
FIG. 9 is a graph used for explaining calculation of the playback speed of a motion picture in the fourth example operation of the motion-picture time-scale control instruction system in the playback mode 2.

FIGS. 8 and 9 show an example which has been generalized from the modification shown in the description of FIG. 6 or from the example of FIG. 7. That is, FIGS. 8 and 9 show an example of time-scale conversion for the case in which timing set information (TS) is used in order to synchronize the motion-picture data with the music data at the playback start position and a plurality of intermediate positions. This time-scale conversion is preferably used so as to attain a stage effect in which the motion picture and the piece of music are synchronized at the playback start position and at a plurality of intermediate positions. The uppermost row of FIG. 8 merely shows the music data in the form of a musical score, which is not strictly related to the music data shown in the second row.

In the example of FIG. 8, as shown in the second and third rows, the timing set information is input in such a manner that the playback start position (the start of the first section p0) of the motion-picture data is synchronized with the playback start position (the start of the first section n0) of the music data ("SET" & "FIX"), and that a plurality of sections p1, p2, p3, p4, etc. (the start points of the sections p1, p2, p3, p4, etc.) of the motion-picture data are synchronized with a plurality of sections n1, n2, n3, n4, etc. (the start points of the sections n1, n2, n3, n4, etc.) of the music data ("SET").

In this case, playback of the first motion-picture data section p0 and the first music data section n0 which have been set to be synchronized with each other are started at a predetermined start time t0. Subsequently, the time scale for playback of the motion-picture data is controlled in such a manner that playback of the motion-picture data section p1 is synchronized with playback of the music data section n1, which has been set to be synchronized with the motion-picture data section p1 is started at the specific time t1. Even after the specific time t1, the time scale for playback of the motion-picture data is controlled in such a manner that the plurality of motion-picture data sections p1, p2, p3, p4, etc. are synchronized with the plurality of music data sections n1, n2, n3, n4, etc.

FIG. 9 schematically shows a method of calculating the record position (frame) of motion-picture data to be read out from the dedicated RAM 70 as a function of time in order to control the time scale for playback of the motion-picture data. The CPU 1 supplies the time scale control section 71 with start time data representing the playback start time t0 at which playback of the first motion-picture data section p0 and playback of the first music data section n0 are to start, and specific time data which represent the specific times t1, t2, t3, t4, etc. at which playback of the music data sections n1, n2, n3, n4, etc. which have been set to be synchronized with the specific motion-picture data sections p1, p2, p3, p4, etc. are to be started.

Upon receipt of these time data, the time scale control section 71 controls the motion-picture playback section 73 to start the playback of the first motion-picture data section p0 at time t0, and to successively start playback of the specific motion-picture data sections p1, p2, p3, p4, etc. at the specific times t1, t2, t3, t4, etc. The motion-picture playback section 73 calculates respective read-out speeds for a period from time t0 to t1, a period from time t1 to t2, a period from time t2 to t3, a period from time t3 to t4, etc. In FIG. 9, the calculated read-out speeds are represented by the slopes of segments corresponding to the period from time t0 to t1, the period from time t1 to t2, the period from time t2 to t3, the period from time t3 to t4, etc. The motion-picture playback section 73 successively plays back the motion-picture data sets corresponding to these periods at the respective calculated read-out speeds.

With this operation, at the start time t0, playback of the first motion-picture data section p0 is started in synchronism with playback of the first music data section n0; and at the specific times t1, t2, t3, t4, etc., the specific motion-picture data sections p1, p2, p3, p4, etc. are played back in synchronism with the specific music data sections n1, n2, n3, n4, etc. which have been set to be synchronized with the specific motion-picture data sections p1, p2, p3, p4, etc.

That is, as shown in the example of motion-picture time scale conversion of FIG. 8, for the music data, motion-picture data consisting of a plurality of frames are stored in the dedicated RAM 70. When the user designates a plurality of points for synchronization, read-out positions between the respective points are calculated automatically by means of interpolation, and the motion-picture data are played back, while the playback speed is changed (among "normal," "slow," and "rapid" speeds). Accordingly, in an example case in which the positions on the musical score (the uppermost row of FIG. 8) at which strong notes are present are selected as specific positions for music playback and specific exciting motion-picture frames (exciting images composed of, for example, red, blue, and yellow) are set to be synchronized at the specific positions, when a tone corresponding to each of the strong notes is generated, the specific motion-picture frame is displayed in synchronism with the generation of the tone. Thus, there can be obtained a stage effect in which sound and a motion picture are linked with each other and which appeals to an audience at a concert site or a club event.

[Playback Mode 3]

In the motion-picture time scale control instruction system, when the both mode switches M1 and M2 of the panel operation-element unit 12 (see FIG. 2) are operated, the motion-picture processing circuit 7 operates in a playback mode 3. In the playback mode 3, during playback of motion-picture data in synchronism with playback of music data, the CPU 1 supplies to the time-scale control section 71 not only the timing set information TS which represents a specific section of the music data and a specific section of the motion-picture data which are desired to be played back at the same timing, but also tempo change information TM which are generated in accordance with operation of a real-time operation element such as a ribbon controller.

On the basis of the timing set information TS, the time-scale control section 71 adjusts the motion-picture playback speed to be instructed to the motion-picture playback section 73 in such a manner that the specific section of the music data and the specific section of the motion-picture data are played back at the same timing and that the playback speed changes in accordance with operation of a real-time operation element such as a ribbon controller. The motion-picture playback section 73 reads out the sampled motion-picture data from the dedicated RAM 70 at the instructed motion-picture playback speed.

In the playback mode 3, a specific section of the motion-picture data is synchronized with a specific section of the music data; and the playback speed of the motion-picture data and the playback speed of the music data are controlled in accordance with the operation of the real-time operation element. Therefore, various types of stage effects can be attained.

[Various Other Embodiments]

The motion-picture time scale control processing of the present invention has been described with reference to a specific embodiment; however, the present invention is not limited thereto. For example, in the embodiment, motion-picture data are obtained from a VTR (video tape recorder). However, any other motion-picture playback apparatus, such as an LD player, a DVD player, or a PC (personal computer), may be used.

In the embodiment, a relatively large video display is used as an output apparatus. However, no limitation is imposed on the type and size of the output apparatus, and a CRT, a LCD, or a like display may be used. Further, the system may be modified in such a manner that any of a plurality of output apparatuses are used (e.g., an output apparatus for monitoring by the user and an output apparatus for providing images to the audience).

In the present embodiment, the time scale control signal is changed by means of the main system and an operation element included in the motion-picture processing system to thereby control the playback speed of motion-picture data. However, the playback speed of motion-picture data may be controlled on the basis of a time scale control signal supplied from an external controller. In this case, means for inputting an external control signal may be provided in the system. Specifically, the playback speed of motion-picture data may be changed in accordance with by a bent line which is created by a motion-picture control program within the PC on the basis of numerical input and which represents changes in playback speed with time. Alternatively, the playback speed of motion-picture data may be changed in accordance with a hand-drawn input curve which is created by use of an external pointing device such as a mouse or tablet.

In the embodiment, the read-out timing of motion-picture data is corrected automatically on the basis of the playback start point and the playback end point, which are fixed ("FIX"). However, whether "FIX" or "Free" is set at the playback start point and the playback end point may be determined in accordance with needs. Further, if necessary, an excessive portion may be cut, or an insufficient portion may be filled with additional motion-picture data.

In the embodiment, the motion-picture data are handled on the frame-by-frame basis; however, the present invention is not limited thereto. A motion picture which is output from a PC through calculation by a computer graphics program may be used.

In the embodiment, a single motion-picture data set is played back in synchronism with playback of a single music data set. However, a plurality of motion-picture data sets may be played back in synchronism with playback of a single music data set in such a manner that the motion-picture data sets are played back at different timings.

In the present embodiment, commands of the MMC are used in order to control the playback of motion-picture data. However, instead of MMC commands, commands of the MIDI show control (MSC) may be used in order to control the playback of motion-picture data. In such a case, motion-picture data are selected in accordance with a queue number contained in a GO command of the MSC, and the selected motion-picture data are played back.

The specific playback timing of music data maybe designated by time along the music playback time axis or by the number of tempo clocks, bars, or cadences. Further, the specific timing for playback of motion-picture data may be designated by a time on the motion-picture playback time axis or by the frame number of the motion picture.

In the present embodiment, after tempo information is disposed in music data, timing setting (SET) for synchronizing the motion-picture data with the music data at an arbitrary position is performed for the music data. However, the tempo information may be disposed in the music data at an arbitrary point, after performance of the timing setting (SET). In this case, even when the tempo of the music data is edited, the motion-picture data are played back in synchronism with the music data whose tempo has been edited. Therefore, the user can edit the tempo of the music data freely without consideration of synchronization with the motion-picture data.

FIGS. 7 and 8 are depicted in such a manner that, as a result of application of the present invention, the entirety of music data is synchronized with the entirety of motion-picture data. However, such complete synchronization is not always necessary; the present invention encompasses cases in which a desired portion of music data is synchronized with a desired portion of motion-picture data.

The music data may be processed by any method, such as a method of changing the processing interval in accordance with preset tempo designating information, a method of changing the value of timing data in the music data in accordance with preset tempo designating information while maintaining a constant processing interval, or a method of changing, in each processing cycle, the manner of counting timing data in the music data in accordance with the tempo designating information, while maintaining a constant processing interval.

What is claimed is:

1. A motion picture playback apparatus which plays back motion-picture data which are stored in a motion-picture data memory and represent a motion picture, and displays the motion picture on a display device, the motion picture playback apparatus comprising:

an input circuit for receiving tempo information representing a tempo of a piece of music during playback of motion-picture data, the tempo information being one of MIDI tempo clock and MIDI time code;

a tempo value generator for generating a tempo value in accordance with the time intervals of the received tempo information; and a playback control circuit for reading the motion-picture data from the motion-picture data memory at a read-out speed corresponding to the tempo value and for outputting the read-out motion-picture data to the display device.

2. A motion picture playback apparatus according to claim 1, wherein the playback control circuit comprises:

a control signal generation section for generating a playback speed control signal for controlling the playback speed of the motion-picture data in accordance with the received tempo information; and a motion-picture data read out section for reading the motion-picture data from the motion-picture data memory at a read-out rate which defines a read-out time for a unit of data and which is changed by the generated playback speed control signal.

3. A motion picture playback apparatus according to claim 1, further comprising an operation element which is operated by a user to designate a tempo of the piece of music, wherein the input circuit receives an operated position of the operation element as tempo information.

4. A motion picture playback apparatus according to claim 1, further comprising a mixing circuit for mixing the motion-picture data read out by the playback control circuit with separately-input motion-picture data and for outputting the mixed data to the display device.

5. A motion picture playback apparatus which plays back a series of motion-picture data sets which are stored in a motion-picture data memory and represent a motion picture, and displays the motion picture on a display device, the motion picture playback apparatus comprising:

a timing designation circuit for outputting timing set information for designating at least two points among a series of music data sets and at least two points among the series of motion-picture data sets for synchronizing playback timings of the at least two points among the series of music data sets with playback timings of the at least two points among the series of motion-picture data sets; and a playback control circuit for controlling, on the basis of the output timing set information, the timing of reading-out of the motion-picture data from the motion-picture data memory in such a maimer that the play back timings of the at least two points among the series of music data sets coincide with the playback timings of the at least two points among the series of motion-picture data sets, and for outputting the read-out motion-picture data to the display device.

6. A motion picture playback apparatus according to claim 5, further comprising a mixing circuit for mixing the motion-picture data read out by the playback control circuit with separately-input motion-picture data and for outputting the mixed data to the display device.

7. A motion picture playback method for playing back motion-picture data which are stored in a motion-picture data memory and represent a motion picture, and displaying the motion picture on a display device, the motion picture playback method comprising:

an input step for receiving tempo information representing a tempo of a piece of music during playback of motion-picture data, the tempo information being one of MIDI tempo clock and MIDI time codes;

a generating step of generating a tempo value in accordance with the time intervals of the received tempo information; and a playback control step for reading the motion-picture data from the motion-picture data memory at a read-out speed corresponding to the tempo value and for outputting the read-out motion-picture data to the display device.

8. A motion picture playback method according to claim 7, wherein the playback control step comprises:

a control signal generation step for generating a playback speed control signal for controlling the playback speed of the motion-picture data in accordance with the received tempo information; and a read out step for reading the motion-picture data from the motion-picture data memory at a read-out rate which defines a read-out time for a unit of data and which is changed by the generated playback speed control signal.

9. A motion picture playback method according to claim 7, wherein the input step receives, as tempo information, an operated position of an operation element which is operated by a user to designate a tempo of the piece of music.

10. A motion picture playback method according to claim 7, further comprising a mixing step for mixing the motion-picture data read out by the playback control step with separately-input motion-picture data and for outputting the mixed data to the display device.

11. A motion picture playback apparatus for playing back a series of motion-picture data sets which are stored in a motion-picture data memory and represent a motion picture, and for displaying the motion picture on a display device, the motion picture playback method comprising:

a timing designation step for outputting timing set information for designating at least two points among a series of music data sets and at least two points among the series of motion-picture data sets for synchronizing playback timings of the at least two points among the series of music data sets with playback timings of the at least two points among the series of motion-picture data sets; and a playback control step for controlling, on the basis of the output timing set information, the timing of reading-out of the motion-picture data from the motion-picture data memory in such a maimer that the playback timings of the at least two points among the series of music data sets coincide with the playback timings of the at least two points among the series of motion-picture data sets, and for outputting the read-out motion-picture data to the display device.

12. A motion picture playback method according to claim 11, further comprising a mixing circuit for mixing the motion-picture data read out by the playback control step with separately-input motion-picture data and for outputting the mixed data to the display device.

* * * * *